United States Patent
Andersen et al.

(10) Patent No.: US 8,671,989 B2
(45) Date of Patent: Mar. 18, 2014

(54) DRIVE ARRANGEMENT FOR VALVE DEVICES

(75) Inventors: Jens Folkmar Andersen, Fredericia (DK); Karsten Schack Madsen, Odense C (DK); Kenneth Rehhoff, Odense C (DK)

(73) Assignee: Alfa Laval Kolding A/S, Kolding (DK)

(*) Notice: Subject to any disclaimer, the term of this patent is extended or adjusted under 35 U.S.C. 154(b) by 314 days.

(21) Appl. No.: 12/745,572

(22) PCT Filed: Nov. 18, 2008

(86) PCT No.: PCT/EP2008/009728
§ 371 (c)(1),
(2), (4) Date: Jul. 15, 2010

(87) PCT Pub. No.: WO2009/071177
PCT Pub. Date: Jun. 11, 2009

(65) Prior Publication Data
US 2010/0314563 A1     Dec. 16, 2010

(30) Foreign Application Priority Data
Dec. 3, 2007 (DE) .......................... 10 2007 058 007

(51) Int. Cl.
*F16K 11/20* (2006.01)
(52) U.S. Cl.
USPC ............................................ 137/637; 91/536
(58) Field of Classification Search
USPC ................ 137/637, 637.05, 833, 269, 271; 251/31; 91/536, 530, 41 R
See application file for complete search history.

(56) References Cited

U.S. PATENT DOCUMENTS

| | | | | |
|---|---|---|---|---|
| 2,627,432 A | * | 2/1953 | Poore | 291/2 |
| 3,215,158 A | * | 11/1965 | Bass, Jr. et al. | 137/269 |
| 3,226,078 A | * | 12/1965 | Anderson | 251/62 |
| 3,451,423 A | * | 6/1969 | Priese | 137/556 |
| 3,455,329 A | * | 7/1969 | Roth | 137/552 |
| 3,530,897 A | * | 9/1970 | Buchanan | 137/637 |
| 3,931,953 A | * | 1/1976 | Allen | 251/62 |
| 4,111,226 A | * | 9/1978 | Cameron | 137/269 |
| 4,815,692 A | * | 3/1989 | Loiseau et al. | 251/14 |
| 4,838,145 A | * | 6/1989 | Slocum et al. | 91/536 |

(Continued)

FOREIGN PATENT DOCUMENTS

| | | |
|---|---|---|
| DE | 41 23 147 | 1/1993 |
| DE | 203 05 232 | 7/2003 |
| DE | 103 54 340 | 7/2005 |

*Primary Examiner* — Eric Keasel
*Assistant Examiner* — Umashankar Venkatesan
(74) *Attorney, Agent, or Firm* — Fish & Richardson P.C.

(57) ABSTRACT

In order to improve a drive arrangement (15) for valve devices (1) comprising a closing member (3), comprising a movable drive element (6) for making an operative connection with the closing member (3), pre-tensioning means for exerting a pre-tensioning force on the drive element (6) in order to hold the closing member (3) in a base position, preferably closed position, against the working forces acting on the closing member (3), and driving means (17, 21) to move the drive element (6) from the base position against the pre-tensioning force in the direction of the working forces, with a view to the disadvantages of the known drive arrangements, in particular in order to reduce the weight, it is proposed that the pre-tensioning means comprises a compressible fluid, preferably compressed air (21), enclosed in a pre-tensioning container (16), with a static pressure for producing the pre-tensioning force.

13 Claims, 3 Drawing Sheets

(56) References Cited

U.S. PATENT DOCUMENTS

Figure 1:
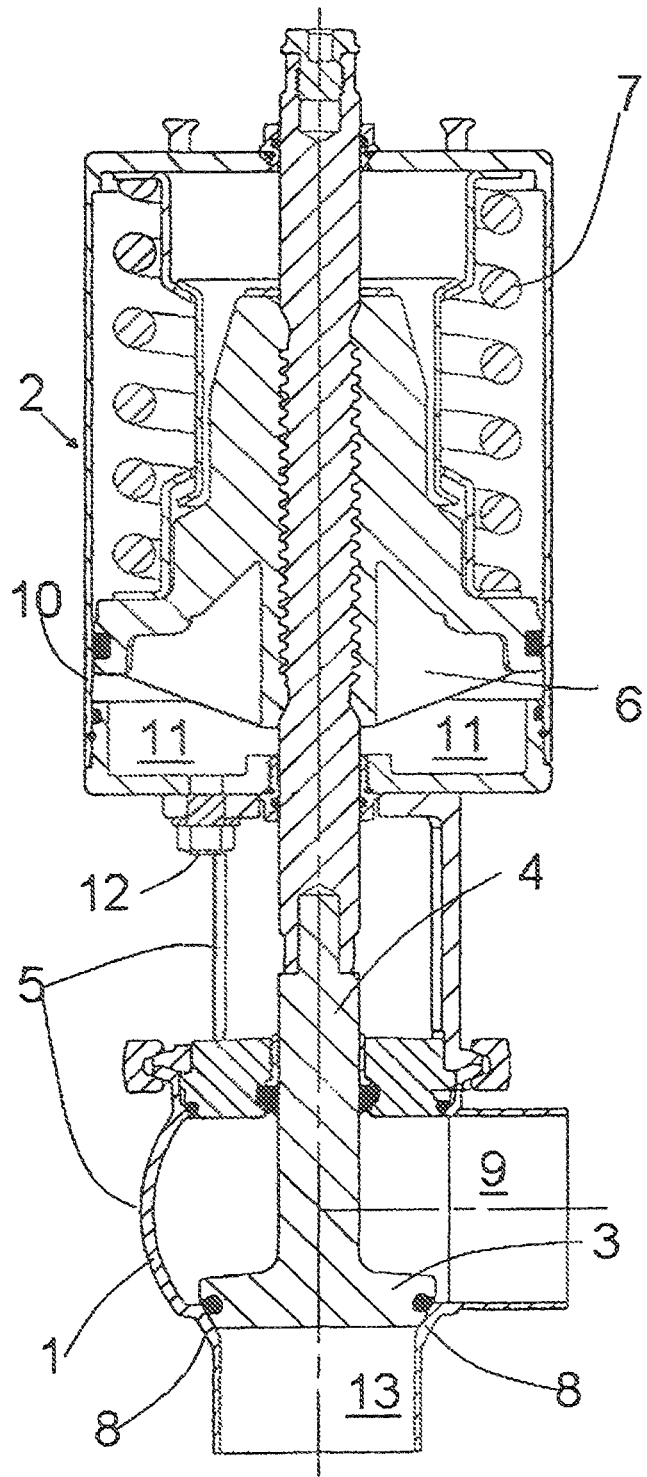

| | | | |
|---|---|---|---|
| 5,341,846 A * | 8/1994 | Framberg | 137/884 |
| 5,577,532 A * | 11/1996 | Palmer | 137/460 |
| 5,682,807 A * | 11/1997 | Mentink | 91/530 |
| 5,993,339 A * | 11/1999 | Poiret | 474/109 |
| 6,293,300 B1 * | 9/2001 | Dumke et al. | 137/312 |
| 7,198,063 B2 * | 4/2007 | Abe | 137/606 |
| 2003/0196615 A1 * | 10/2003 | Asano et al. | 123/90.11 |

* cited by examiner

DRIVE ARRANGEMENT FOR VALVE DEVICES

The present invention relates to a drive arrangement for valve devices comprising a closing member, comprising a movable drive element for making an operative connection with the closing member, pre-tensioning means for exerting a pre-tensioning force on the drive element in order to hold the closing member in a base position, preferably closed position, against the working forces acting on the closing member, and driving means to move the drive element from the base position against the pre-tensioning force in the direction of the working forces.

Drive arrangements of the aforesaid type in the form of valve drives or valve actuators are the most widespread and conventional means for driving e.g. shut-off valves and similar. A driving piston operatively connected to the valve stem which can be moved inside the mostly cylindrical drive housing in the longitudinal direction of the stem is usually provided as the drive element. In order to ensure that in the case of closing valves, the closing member with the valve stem is pressed with sufficient force into the valve seat in the inactive state of the valve, the driving piston is usually held in the lower closed position by a steel spring. The latter situation is present in a normally closed (NC) valve design. In a normally open (NO) design, the inactive state of the valve being maintained by the spring force is the open position. Compressed air is usually used for opening the valve. The compressed air is introduced into the chamber below the actuator piston through the opening in the solenoid valve. This increases the static pressure in this chamber so that the piston is raised whilst the steel spring is simultaneously further compressed.

In order to ensure a sufficient fit of the closing member in the valve seat, heavy steel springs are used in the prior art, which must be pre-stressed and encased in the housing. Encasing of the springs in the actuator is necessary since otherwise it would be difficult and hazardous to open the actuator for maintenance purposes.

A disadvantage with using steel springs as pre-tensioning means is in particular the large mass of the steel springs and the necessary housing used to encase the steel springs. The valve drive according to the prior art thereby acquires an undesirably large mass. A further disadvantage of steel springs as pre-tensioning means according to the prior art is that the pre-tensioning force cannot be adapted or only with relatively great effort. This is particularly important with a view to the wear in the valve seat area. Without the possibility of re-adjusting the pre-tensioning force, the steel springs in the prior art must be selected when new such that a sufficient pressing force is still achieved following wear of the valve seat.

Another disadvantage when using steel springs as a pre-tensioning element in generic drive arrangements is that the steel springs must apply the maximum force required for the application in the least compressed state. When the piston opens against the spring force however, by introducing compressed air into the chamber below the actuator piston, the restoring force of the steel spring is increased further, for example, according to Hook's law. A high expenditure of energy is therefore disadvantageously required to open the closing valve. Ideally on the other hand no counter-force at all would be required for the opening process of the valve since this counteracts the opening process. Thus, in the known valve drives the smallest force is exerted by the steel springs when a large force is required for the application and on the other hand, the largest force is delivered by the spring when no force would be required for the application. This therefore has the disadvantage that a large volume of compressed air is needed to open the valve against the spring force.

Known from US 2003/0196615 A1 is a valve drive for an injection valve for motor vehicle engines in which a combination of compressed air and magnetic force generated by coils is used for opening and closing the valve disk. In this prior art, the compressed air acts on both sides of the driving piston in such a manner that a pneumatically neutral state is formed in the middle position of the valve disk. In the closed state of the valve however, a pneumatic restoring force exists, which strives to open the valve again. This restoring force must be magnetically overcome by the closing coil. The known drive arrangement is therefore not a drive arrangement suitable for shut-off devices in which reliable closing of the valve in the inactive state is important.

It is therefore the object of the present invention to improve a generic drive arrangement with a view to the disadvantages of the known drive arrangements, in particular to reduce the energy consumption during operation, and to allow optimum operation of the drive arrangement independent of wear.

This object is achieved according to the invention whereby in a drive arrangement of the type specified initially, the pre-tensioning means comprises a compressible fluid, preferably compressed air, enclosed in a pre-tensioning container, with a static pressure for producing the pre-tensioning force.

According to the invention, the drive arrangement can be made considerably lighter in this way since a heavy steel spring for generating the pre-tensioning force is omitted. In addition, the use of a drive arrangement according to the invention in existing industrial systems presents no problems since compressed air for operating the valve drives is commonly available. Unlike conventional valve drives, according to the invention the compressed air is not only used for moving the valves out of the inactive (i.e. closed for a normally closed design and open for a normally open design) state but also for permanently maintaining it in the inactive state of the valve. The compressed air used for holding the valve in its inactive state should be selected so that its static pressure is sufficient to produce the required pre-tensioning force of the closing member. Thus, in the case of a normally closed valve, compressed air, according to the invention, is also and unconventionally used for maintaining the valve in its closed position. Conversely, in the case of a normally open valve, compressed air, according to the invention, is also and unconventionally used for maintaining the valve in its open position.

In an advantageous embodiment of the invention, it is provided that the drive element comprises a cylinder and a driving piston which can be moved inside the cylinder by a stroke. Thus, the same principle which is conventionally already used for opening normally closed shut-off valves against the spring force of a steel spring is advantageously used for holding open the closing member with a predefined pre-tensioning force. Conversely, according to the invention, the same principle which is conventionally already used for closing normally open valves against the spring force of a steel spring is advantageously used for keeping open the closing member with a predefined pre-tensioning force.

In a particularly advantageous embodiment of the invention, the volume of the pre-tensioning container is a multiple of, preferably at least four times, the stroke volume of the drive element. In the case of a normally closed valve, this yields the substantial advantage that the force required to open the shut-off valve remains substantially constant over the opening stroke of the valve. This can be attributed to the fact that the fraction by which the total volume of the pre-tensioning container is reduced during raising of the driving piston by its stroke is only small. Hence, the counteracting pressure only increases slightly above the value applied to produce the pre-tensioning force. Consequently, the force required to open the valve is significantly lower than in conventional valve drives pre-stressed with a steel spring. In the case of compressed-air opening valves most frequently found in practice, a reduction in the volume of compressed air required for opening is obtained, leading to a saving of energy. Conversely, in the case of a normally open valve, this yields the substantial advantage that the force required to close the valve remains substantially constant over the closing stroke of the valve.

In an advantageous embodiment of the invention, the pre-tensioning container is configured as a section of the cylinder. In this case, a container required in addition to the valve drive itself for the compressed air required for applying the pre-tensioning force or the other compressible fluid is advantageously dispensed with.

If the pre-tensioning container has connecting means for connection of an expansion pre-stressing vessel on a side of the drive element facing away from the closing member, in an advantageous embodiment of the invention it can be particularly favourably achieved that the volume of the pre-tensioning container is significantly larger than the stroke volume of the drive element. As has been mentioned, in the case of a normally closed valve this has the advantage that an approximately constant pre-tensioning force is maintained during opening of the valve. Conversely, in the case of a normally open valve, this has the advantage that an approximately constant pre-tensioning force is maintained during closing of the valve.

A preferred variant of the invention provides that the connecting means are configured for connection to the pre-tensioning container of another drive arrangement of a similar type. This allows a plurality of valve drives to be connected together, thus increasing the total volume of the compressed air generating the pre-tensioning force. In the case of a normally closed valve, the proportional reduction in volume due to the opening stroke of a single actuator relative to the total volume of the coupled pre-tensioning containers is then only of little significance. The effect of an approximately constant pre-tensioning force which must be overcome during opening can be achieved particularly simply by this measure. The connecting together of a plurality of drive arrangements according to the invention will hardly present any problems in practice since a plurality of closing members are usually provided in systems. Conversely, in the case of a normally open valve, the proportional reduction in volume due to the closing stroke of a single actuator relative to the total volume of the coupled pre-tensioning containers is then only of little significance.

A preferred embodiment of the invention provides that the driving means comprise compressed air. Compressed air is the pneumatic driving means usually available in technical installations.

If, in one embodiment of the invention, the pre-tensioning container is provided with a pressure connection for connection to a compressed fluid supply, preferably a compressed air reservoir and/or compressor, a quantity of compressed air, for example, to achieve a desired pre-tensioning pressure can advantageously be introduced into the pre-tensioning container.

In another preferred embodiment of the invention, the pressure connection is appropriately provided with a non return valve. The non return valve ensures that the system remains continuously under pressure. An additional supply of compressed air or other pressurised fluid is only required to refill the system again. This is necessary in the case of fluid losses caused, for example in the case of a normally closed valve, by small leaks or by operation-dependent opening of a pre-tensioning container.

If, in another preferred embodiment of the invention, the pre-tensioning container is configured in communication with a pressure relief valve, when a plurality of drive arrangements according to the invention are connected together, in the event that all the valves need to be shifted from their inactive positions simultaneously, the appreciable pressure rise which occurs in this case as a result of the reduction in the total pre-tensioning volume this excess pressure can be removed via the pressure relief valve according to the invention. Then, during return of the individual valves compressed fluid must naturally be supplied again in this case. If only a single actuator according to the invention is used and if the volume of the pre-tensioning container is of the same order of magnitude as the stroke volume of the drive element, the desired effect that an approximately constant pre-tensioning force is applied during shifting of the valve from its inactive state can also be achieved by means of the pressure relief valve whereby fluid can escape from the pre-tensioning container during the shifting process via the suitably dimensioned pressure relief valve.

In one variant of the invention, flow measuring means are provided to determine a flow of fluid flowing to the pre-tensioning container. By this means, a measurement for the wear of the valve seat or other defects which cause leaks can advantageously be made.

A compressed air feed valve and a pressure relief valve can be designed in a block to ensure feedback of both valves by a suitable controller in a particularly simple manner. The feedback can be achieved manually, in a wireless fashion or automatically on the basis of the fluid pressure which is measured in the pre-tensioning containers of the valve drives.

The object of the invention can equally be achieved by an ensemble comprising at least two drive arrangements according to the aforesaid types wherein the pre-tensioning containers of at least two of the drive arrangements are configured as being in communication with one another.

The invention is described as an example in a preferred embodiment with reference to the drawings where further advantageous details can be deduced from the figures in the drawings.

Parts having the same function are provided with the same reference numerals.

In detail, the figures in the drawings show:

FIG. 1: a closing valve with a prior art drive in a sectional view

Figure 2:
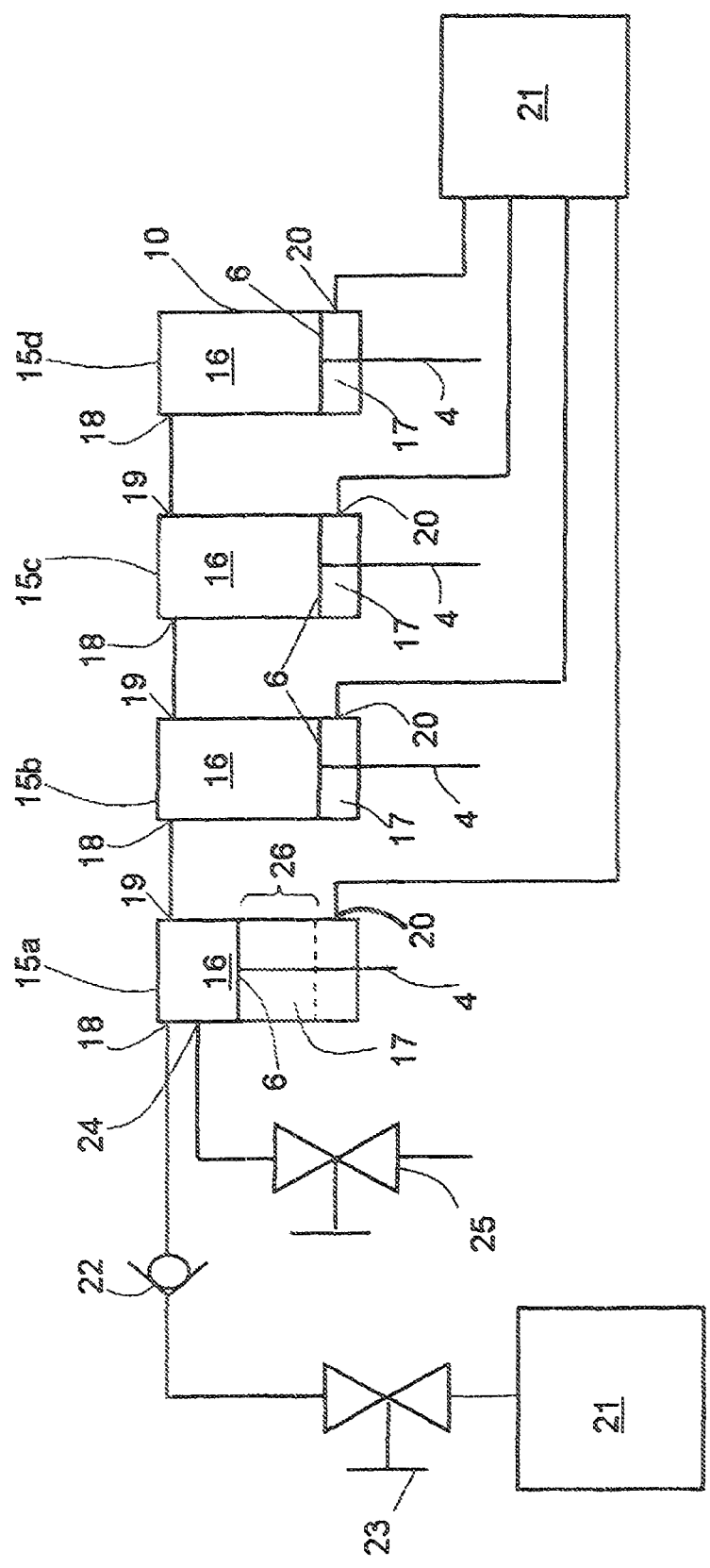
Figure 3:
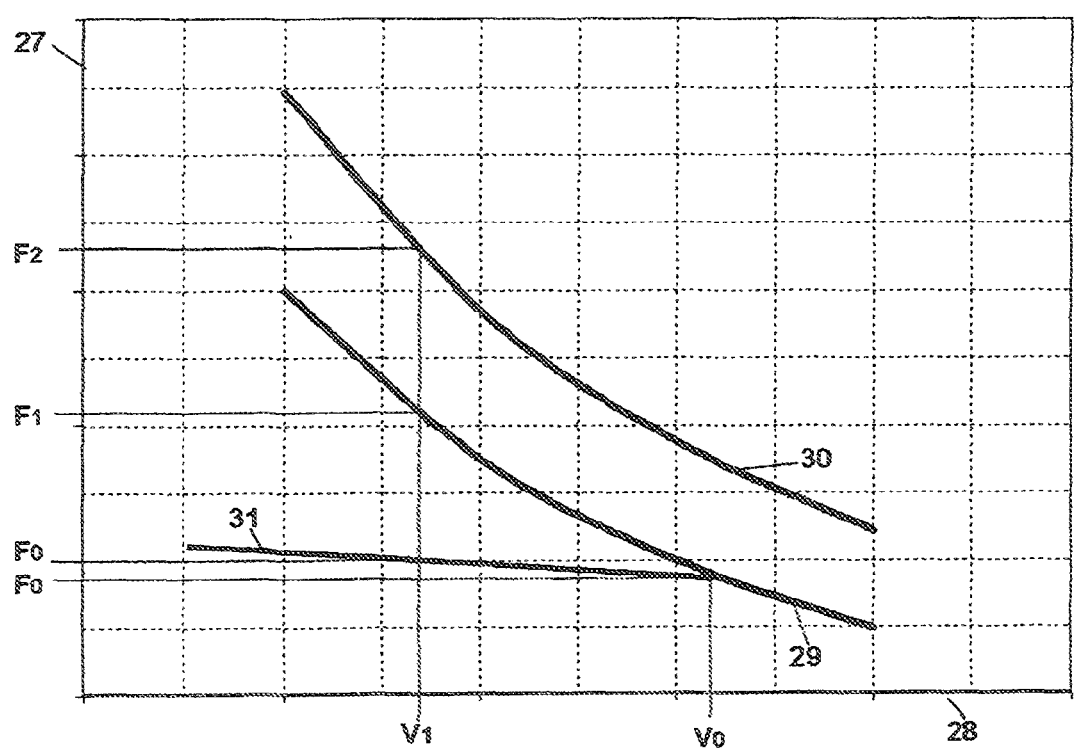

FIG. 2: a schematic diagram of a preferred example of a system wherein an ensemble of valve drives according to the invention the is implemented, and FIG. 3: a force-volume diagram to illustrate the advantages and operating mode of the invention compared to the prior art.

FIG. 1 shows a normally closed shut-off valve 1 having a conventional drive 2 according to the prior art in a vertical sectional view. The shut-off valve 1 has a valve disk 3. The valve disk 3 is connected to a multi-part valve stem 4. The valve stem 4 extends through the valve housing 5 to the drive 2.

A working piston 6 is provided inside the drive 2 firmly screwed to the upper section with the valve stem 4. On the upper side in the figure, facing away from the valve, the working piston 6 is pressed downwards with a pressing force by means of a steel spring 7. The valve disk 3 is thereby pressed firmly into a valve seat 8 of the shut-off valve 1 to ensure that a first pipe section 9 is firmly shut off from a second pipe section 13. The entire drive 2 is configured as a hollow cylinder 10. Located on a side of the working piston 6 facing the shut-off valve 1 is a coherent pressure chamber 11 disposed in an annular manner around the valve stem 4. The pressure chamber 11 inside the hollow cylinder 10 is provided with a compressed air connection 12 for filling the pressure chamber 11 with compressed air to move the working piston 6 upwards against the spring force of the steel spring 7, thereby raising the valve disk 3 from the valve seat 8 to allow passage of a fluid or similar from the first pipe section 9 to the second pipe section 13.

In the conventional valve drive 2 the steel spring 7 is so strongly pre-stressed that the valve disk 3 is pressed into the valve seat 8 with a pre-defined minimum force. This pretensioning force of the steel spring 7 makes it necessary to manufacture the hollow cylinder 10 forming the housing of the drive 2 from heavy steel material. A disadvantage when operating the conventional shut-off valve 1 by means of the conventional drive 2 is that for opening the shut-off valve 1 the valve disk 3 must be moved by means of the valve stem 4 and the working piston 6 connected thereto against the steel spring 7. In this case, an additional restoring force of the steel spring 7 builds up, e.g. according to Hook's law as a linear function of the deflection and this is greater than the pretensioning of the steel spring 7 required for the pressing. If the counteracting force is so large that a corresponding counter-pressure can no longer be built up in the pressure chamber 11 with compressed air, the valve 1 according to the prior art can disadvantageously no longer be opened completely. This has the disadvantage that an excessively large amount of compressed air is required in the pressure chamber 11 in the prior art in order to apply the corresponding force for moving the working piston against the steel spring 7.

The invention is described hereinafter with reference to FIG. 2 showing an exemplary embodiment in which four valve drives are used. One skilled in the art will recognize that the working principle according to the invention is not limited to this particular number of valve drives. Instead, any other number of valve drives is suitable. The invention will, in fact, function particularly well when a maximum number of valve drives is used. An ensemble 14 of four valve drives 15*a*, 15*b*, 15*c*, 15*d* can be seen schematically in FIG. 2. Each valve drive 15*a*, 15*b*, 15*c*, 15*d* has a working piston 6. As is also the case in the prior art, the working piston 6 is firmly connected to a valve stem 4 which is merely shown schematically. Not shown in the diagram are the shut-off valves assigned to each valve drive 15*a*, 15*b*, 15*c*, 15*d*. Each valve drive 15*a*, 15*b*, 15*c*, 15*d* is configured as a hollow cylinder 10. Unlike the situation in the valve drive 2 according to the prior art, the valve stem 4 does not pass through the working piston 6 in the valve drives 15*a*, 15*b*, 15*c*, 15*d* according to the invention. The working piston 6 divides the hollow cylinder 10 into a pressure chamber 16 facing away from the valve and a lower valve-side pressure chamber 17.

In each valve drive 15*a*, 15*b*, 15*c*, 15*d* the pressure chamber facing away from the valve has a shut-off pressure connection 18. In addition, the pressure chamber 16 facing away from the valve of each valve drive 15*a*, 15*b*, 15*c*, 15*d* has an additional compressed air connection 19.

The valve-side pressure chamber 17 has an opening compressed-air connection 20. Each opening compressed-air connection 20 is connected via a solenoid valve not shown to a compressed air reservoir or a compressed air source 21.

The valve drive 15*a* is connected to a compressed air source 21 via the shut-off compressed air connection 18 in the pressure chamber 16 facing away from the valve via a non return valve 22 and a maximum pressure supply valve 23 located downstream of the non return valve 22. The compressed air source 21 can be identical to or different from the compressed air source 21 to which the valve-side pressure chamber 17 is connected.

The pressure chamber 16 of the valve drive 15*a* facing away from the valve is further connected via an excess pressure connection 24 to a pressure relief valve 25.

The valve drives 15*a*, 15*b*, 15*c*, 15*d* are connected together to form an ensemble 14 whereby the additional compressed air connection 19 of the pressure chamber 16 facing away from the valve of the valve drive 15*a* is connected to the shut-off compressed air connection 18 of the valve drive 15*b*, the additional compressed air connection 19 of the valve drive 15*b* is connected to the shut-off compressed air connection 18 of the valve drive 15*c* and the additional compressed air connection 19 of the valve drive 15*c* is connected to the shut-off compressed air connection 18 of the valve drive 15*d*. In this way, the pressure chambers 16 facing away from the valve of the valve drives 15*a*, 15*b*, 15*c*, 15*d* communicate with one another to form a total pressure chamber with the cumulative volume of the four individual pressure chambers 16 facing away from the valve.

In the schematic diagram in FIG. 2 the valve drive 15*a* is in an open state. This can be seen from the fact that the working piston 6 is deflected upwards with respect to the base position according to the valve drives 15*a*, 15*b*, 15*c*, 15*d*. As a result, the volume of the pressure chamber 16 facing away from the valve of the valve drive 15*a* is reduced by the amount of the stroke volume 26. The ensemble 14 of the valve drives 15*a*, 15*b*, 15*c*, 15*d* according to the invention is operated as follows. In the closed base state, the working piston 6 is in the base position as is the case in the drives 15*b*, 15*c*, 15*d* in FIG. 2. The driving piston 6 is held in this closed position as a result of the static pressure prevailing in the pressure chamber 16 which acts on the working piston 6. According to the invention, the static pressure in the pressure chamber 16 facing away from the valve thus takes over the function of the steel spring 7 in the conventional valve drive 2 of the shut-off valve 1 according to FIG. 1 from the prior art. By this means the weight of the valve drives 15*a*, 15*b*, 15*c*, 15*d* can be reduced significantly compared with the conventional valve drive 2 since the steel spring 7 can be omitted among other things. If compressed air is now admitted into the valve-side pressure chamber 17 of the valve drive 15*a* by opening the solenoid valve, the static pressure in the pressure chamber 17 increases until the pressure in the valve-side pressure chamber 17 exceeds the static pressure prevailing in the interconnected pressure chambers 16 facing away from the valve of the ensemble 14. In this situation, the working piston 6 is raised. The valve disk 3 not shown in FIG. 2 thereby opens from the valve seat 8 via the connected valve stem 4.

As a result of the pressure chambers 16 of the four valve drives 15*a*, 15*b*, 15*c*, 15*d* shown as an example being connected together to form a common cumulative pressure chamber, the stroke volume 26 by which the pressure chamber 16 of the valve drive 15*a* is reduced is small compared with the cumulative total volume of the four pressure chambers 16 of the four valve drives 15*a*, 15*b*, 15*c*, 15*d*. This has the result that the "deflection" of the air spring formed by the pressure chamber 16 is so small that the static pressure in the communicating pressure chambers 16 of the drives 15*a*, 15*b*, 15*c*, 15*d* remains substantially unchanged. As a result, only a relatively small amount of compressed air must be introduced into the valve-side pressure chamber 17 of the valve drive 15*a* to raise the working piston 6 and thus the valve disk. An ensemble 14 of valve drives 15*a*, 15*b*, 15*c*, 15*d* according to the invention connected together in this way can therefore be operated with reduced costs for compressed air compared with the prior art.

Whereas the above embodiment relates to the usage of a valve drive according to the invention in conjunction with a normally closed valve design, one skilled in the art will appreciate that the valve drive according to the invention can equally be used in conjunction with a normally open valve design. In that case, the state of the valves shown illustrated in FIG. 2 are merely to be reversed. Thus, if the valve drive according to the invention and as shown in FIG. 2 is to be used in conjunction with a normally open valve design, the valve drive 15a would be in a position to close the associated valve, whereas the valve drives 15b, 15c, 15d would be in a position to open the associated valve. In the latter case, the valve drives 15b, 15c, 15d would be maintained in their open state by the air spring action of the joint pressure chambers 16 which replaces the steel spring in conventional designs.

FIG. 3 shows the pressure relationships during operation of a single valve drive according to the invention juxtaposed in an idealised manner to the pressure relationships of an ensemble of several valve drives according to the invention, in which the pressure chambers 16 facing away from the valve are connected in communication with one another via the compressed air connection 18, 19.

FIG. 3 shows a diagram with a force axis 27 which reflects the pressure relationships prevailing in the pressure chamber 16 and a volume axis 28. The volume $V_0$ of the pressure chamber 16 when the valve is closed is plotted on the volume axis 28. Also plotted on the volume axis 28 is the volume $V_1$ of the pressure chamber 16 of the valve drive 15a when the valve is open. The force values pertaining to the volumes $V_0$, $V_1$ are plotted on the force axis 27. The pairs of values are plotted by means of the curves 29, 30, 31.

In the case of curve 29, unlike the situation plotted in FIG. 2, a valve drive 15 according to the invention is operated alone. In this case, no other valve drive is connected together with the pressure chamber 16 facing away from the valve via the additional compressed air connection 19. Curve 29 corresponds to a situation in which a constant temperature T1 prevails in the pressure chamber 16.

In this operating mode, the counter-force acting on the working piston 6 increases during travel of the working piston 6 for opening the valve in accordance with curve 29. It can be seen that in the base state pertaining to the volume $V_0$, the curve 29 has a force value $F_0$ which corresponds to the pressing force of the valve disk in the valve seat required in the closed state.

On opening the valve, the volume of the pressure chamber 16 decreases from the value $V_0$ along the curve 29 towards the volume value $V_1$. This results in an increase in the force to the value $F_1$ which acts on the working piston 6 as a result of the increase in pressure when the working piston 6 is located in the uppermost opened position. Thus, for opening the valve a correspondingly large quantity of compressed air must be introduced into the valve-side pressure chamber 17 to overcome the force $F_1$. Disadvantageously the force $F_1$ is greater than the force $F_0$ although the force $F_0$ already ensures the maximum required contact pressure on the valve disk.

Curve 30 plots corresponding relationship as for curve 29. Unlike curve 29, however, a greater temperature T2 of the compressed air prevails in the pressure chamber 16. In the case of curve 30, this has the result that for complete opening of the valve, the force $F_2$ must now be applied corresponding to a volume $V_1$ in the pressure chamber 6. The force $F_2$ is greater than the force $F_1$ which, as has been explained, is greater than the force $F_0$.

In contrast curve 31 shows the situation obtained when, according to the invention, a plurality of drives 15a, 15b, 15c, 15d according to the invention are connected together to form an ensemble 14 via the corresponding pressure influences 18, 19. In this idealised representation it can be seen that the counter-force $F_0'$ pertaining to the volume $V_1$ in the open state is only slightly greater than the basic counter-force $F_0$. This can be attributed to the fact that the stroke, i.e. the difference $V_0-V_1$ is very small in relation to the total volume of four interconnected drives, corresponding to $4*V_0$. According to practical estimation, an approximately constant force is thus obtained so that the counter-force for $V_1$ only differs insignificantly from the counter-force for $V_0$.

Thus, an improved drive particularly for closing valves has been proposed according to the invention which can have a lighter structure than conventional valve drives and which can be operated cost-effectively. By using an "air spring", the spring force in the closed state of the valve can be adapted to different operating conditions to use as little compressed air as possible.

REFERENCE LIST

1 Shut-off valve
2 Drive
3 Valve disk
4 Valve stem
5 Valve housing
6 Working piston
7 Steel spring
8 Valve seat
9 First pipe section
10 Hollow cylinder
11 Pressure chamber
12 Compressed air connection
13 Second pipe section
14 Ensemble
15a Valve drive according to the invention
15b Valve drive according to the invention
15c Valve drive according to the invention
15d Valve drive according to the invention
16 Pressure chamber facing away from valve
17 Valve-side pressure chamber
18 Shut-off compressed air connection
19 Additional compressed air connection
20 Opening compressed air connection
21 Compressed air source
22 Non return valve
23 Maximum pressure supply valve
24 Excess pressure connection
25 Pressure relief valve
26 Stroke volume
27 Force axis
28 Volume axis
29 Operating curve during isolated operation of a drive according to the invention at temperature T1
30 Operating curve during isolated operation of a drive according to the invention at temperature T2, where T2>T1
31 Operating curve (idealised) during operation of a drive ensemble of coupled drives according to the invention

The invention claimed is:

1. A drive arrangement for a valve device, the valve device having a closing member, the closing member having a movable drive element for making an operative connection with the closing member, pre-tensioning means for exerting a pre-tensioning force on the drive element for holding the closing member in a base position against working forces acting on the closing member, and driving means capable of moving the drive element from the base position against the pre-tensioning force in the direction of the working forces, wherein the pre-tensioning means comprises compressed air enclosed in a pre-tensioning container, with a static pressure for producing the pre-tensioning force, wherein the volume of the pre-tensioning container is a multiple of the stroke volume of the drive element and the pre-tensioning container is provided with connecting means, the connecting means being configured for connection to a second pre-tensioning container of a second drive arrangement of a similar type, wherein the movable drive element is movable independently of a movable drive element of said second drive arrangement, wherein the drive arrangement comprises a valve-side pressure chamber and wherein the valve-side pressure chamber is so constructed and arranged as to be capable of increasing a static pressure in the valve-side pressure chamber until the pressure in the valve-side pressure chamber exceeds the static pressure in the pre-tensioning container, to move the drive element.

2. The drive arrangement according to claim 1, wherein the drive element comprises a cylinder and a driving piston which can be moved inside the cylinder.

3. The drive arrangement according to claim 2, wherein the pre-tensioning container is configured as a section of the cylinder.

4. The drive arrangement according to claim 2, wherein the volume of the pre-tensioning container is at least four times the stroke volume of the drive element.

5. The drive arrangement according to claim 1, wherein the volume of the pre-tensioning container is a multiple of at least four times the stroke volume of the drive element.

6. The drive arrangement according to claim 1, wherein the pre-tensioning container has connecting means for connection of an expansion pre-stressing vessel on a side of the drive element facing away from the closing member.

7. The drive arrangement according to claim 1, wherein the driving means comprise compressed air.

8. The drive arrangement according to claim 1, wherein the pre-tensioning container is provided with a pressure connection for connection to a compressed air supply.

9. The drive arrangement according to claim 8, wherein the pressure connection is configured in communication with a non return valve.

10. The drive arrangement according to claim 8, wherein the compressed air supply comprises a compressed air reservoir or a compressor.

11. The drive arrangement according to claim 1, wherein the pre-tensioning container is configured in communication with a pressure relief valve.

12. The drive arrangement according to claim 1, wherein the base position is a closed position.

13. An ensemble comprising at least two drive arrangements, each according to any one of claim 1, 2, 12, 4 or 10, wherein the pre-tensioning containers of the at least two drive arrangements are configured as being in communication with one another.

* * * * *